United States Patent [19]
Mungo et al.

[11] Patent Number: 5,101,940
[45] Date of Patent: Apr. 7, 1992

[54] VEHICLE BRAKING DISC SECURED WITH AN ASSEMBLY OF PINE AND BLOCKS

[75] Inventors: Keith Mungo, Liverpool; Brian D. Thomas; Simon C. Bromley, both of Wirra, all of England

[73] Assignee: Sab Sabco (Holdings) B.V., Bromborough, England

[21] Appl. No.: 611,794

[22] Filed: Nov. 5, 1990

[30] Foreign Application Priority Data

Nov. 7, 1989 [GB] United Kingdom ............... 8925079
Jul. 24, 1990 [GB] United Kingdom ............... 9016211

[51] Int. Cl.⁵ .......................................... F16D 65/10
[52] U.S. Cl. ............................. 188/218 XL; 188/73.2
[58] Field of Search ............... 188/218 XL, 59, 73.2; 301/6 WB, 6 W, 6 E

[56] References Cited

U.S. PATENT DOCUMENTS

| | | | |
|---|---|---|---|
| 2,804,176 | 8/1957 | Trevaskis | 188/218 XL |
| 3,513,949 | 5/1970 | Klassen et al. | 188/218 XL X |
| 3,606,937 | 9/1971 | Falch et al. | 188/218 XL |
| 5,010,985 | 4/1991 | Russell et al. | 188/218 XL |

FOREIGN PATENT DOCUMENTS

| | | | |
|---|---|---|---|
| 0216534 | 4/1987 | European Pat. Off. | 188/18 A |
| 1263732 | of 1972 | United Kingdom | 188/218 XL |
| 2110793 | of 1983 | United Kingdom | 188/218 XL |

Primary Examiner—Robert J. Oberleitner
Assistant Examiner—Josie A. Ballato
Attorney, Agent, or Firm—Oblon, Spivak, McClelland, Maier & Neustadt

[57] ABSTRACT

The present specification discloses a wheel comprising a central hub and an outer rim interconnected by a web, with a pair of annular braking discs being mounted one on each side of the web by at least two connection assemblies. Each connection assembly comprises a block member adapted to be bolted to the web, the block member having an elongated groove located in one of the side faces of the block member, the groove having an arcuate cross-section, with an elongate pin member engaging in the groove and in an elongate groove of arcuate cross-section provided in the braking disc, the grooves extending generally radially of the braking disc to one side of an aperture provided in the braking disc, over which aperture the block member is located. The opposite side face of the block member is also held by the braking disc in a region of the braking disc on the opposite side of the aperture. The pin member is perferably a roll pin which is held in the facing grooves of the block member and braking disc in a compressed condition.

14 Claims, 6 Drawing Sheets

VEHICLE BRAKING DISC SECURED WITH AN ASSEMBLY OF PINE AND BLOCKS

The present invention relates to a wheel incorporating a braking disc.

In particular the present invention relates to a wheel, primarily for use on railway vehicles, comprising a central hub and an outer rim interconnected by a web, an integral annular braking disc being mounted on each side of the wheel.

Certain known wheels of the above described construction have annular braking discs which are merely bolted to the web of the wheel, the bolts each passing first through an aperture in one braking disc and then, usually with clearance, through an aperture in the web, the bolts engaging in complementarily threaded bores in the other braking disc or passing through apertures in the other braking disc and being engaged with complementarily threaded nuts. To provide for a smooth braking surface on the respective discs, the said apertures in the braking discs are located in recesses on the braking surface. The braking discs thus sandwich the web of the wheel and expansion of the braking discs due to the heat generated under braking, is allowed for by the bolts being able to move in the apertures in the web.

However, whilst the braking discs can be positively secured to the wheel in this manner and the radial extent of the braking disc can be maximised having regard to the distance between the hub and outer rim, there is a stress problem which occurs around the apertures in the braking discs, through which the bolts pass, the bolts having to be tightened to hold the discs against the web and the resultant thermal stress forces leading to localised stress cracking in the braking discs as a consequence of the continued heating and cooling of the braking discs under braking.

The aim of the present invention is to provide a wheel wherein the braking discs are indirectly secured to the web so as to allow for expansion and contraction due to the heat produced and dissipated under braking, whilst avoiding the above stress problems resulting from direct attachment.

According to the present invention there is provided a wheel comprising a central hub and an outer rim interconnected by a web, a pair of annular braking discs being mounted one on each side of the web, each annular braking disc being secured to the web by at least two connection assemblies, each connection assembly comprising a block member adapted to be bolted to the web, the block having an elongate groove located in one of the side faces of the block member, said groove having an arcuate transverse cross section, an elongate pin member engaging in said groove and in an elongate groove of arcuate transverse cross section, provided on the braking disc, said grooves in the braking disc extending generally radially of the braking disc to one side of an aperture provided in the braking disc, over which aperture said block member is located, the opposite side face of the block member being held by the braking disc in a region of the braking disc on the opposite side of said aperture In a preferred embodiment of the present invention, four connection assemblies are equi-spaced apart around each annular braking disc and the corresponding connection assemblies of the two braking discs are joined together by a bolt which passes through an aperture in the web and bolts the respective block members together and against opposite sides of the web. Alternatively, two, three or more than four, equi-spaced-apart connection assemblies may be provided.

Further, in one embodiment, the said groove in the braking disc is provided in a lug which projects from the rear face of the braking disc, i.e. the face facing the web, and a like groove is provided in an opposed face of another such lug which is circumferentially spaced from the first mentioned lug with respect to the braking disc. Thus a block member is located between the lugs and secured in position by pin members which engage in the then facing grooves of the block member and lugs. Preferably the pin members take the form of roll pins so that the block member is resiliently held between the lugs. In this case, both of the roll pins in each connection assembly are compressed. Under braking one of the roll pins is further compressed and the block member engages one of the lugs Providing for the positive transfer of forces. Expansion of the braking discs due to the heat generated under braking is allowed for by the lugs being able to move radially along the roll pins. Likewise with contraction as the heat energy is dissipated.

To hold the pin members in the said grooves, projections are preferably provided on the rear face of the braking disc adjacent to one end of each lug. Additional projections are provided on the block member so as to overlap the opposite ends of the grooves in the block member. On assembly the pin members are located on the groove in the block member and the block member and pin members are together slid between the said lugs so that the pin members are engaged in the respective grooves in the said lugs. Then when the braking discs are mounted on the wheel by the block members being bolted to the web, said projections and additional projections prevent the pin members from escaping from the grooves by axial movement.

In another embodiment of the present invention the said groove in the braking disc is provided in a lug which projects from the rear face of the braking disc, i.e. the face facing the web, and a further lug located on the opposite side of the said aperture to the first-mentioned lug is provided with a region which is profiled to engage and grip the said opposite side face of the bock member. In one construction said opposite side face of the block member has a double chamfered transverse profile which extends radially of the braking disc and which can engage in a complementarily or substantially complementarily-shaped groove in said further lug. Alternatively, the double-chamfered profile may be provided on the said further lug with the groove being provided in the said opposite side face of the block member. In another construction said opposite side face of the block member has an arcuate transverse profile which extends radially of the braking disc and which engages in a complementary or substantially-complementary groove in said further lug. Alternatively the arcuate transverse profile may be provided on said further lug and the groove may be located in said opposite side face of the block member. Other constructions with complementary or substantially-complementary profiles for interengaging surfaces on said opposite side face of the block member and said further lug, are of course feasible. In any of the possible constructions for said another embodiment of the present invention the said pin member is preferably a roll pin, the roll pin thus tensioning the block member against the said further lug and being of sufficient spring force to prevent any vibrational movement of the braking disc relative to the block member as can occur in said one embodiment of the present invention wherein the block members are each secured between tensioned roll pins. Preferably also, it is the leading edge of the block member having regard to the direction of rotation of the braking disc for normal forwards motion of the vehicle, which is engaged with said further lug. In this wag the braking forces are transferred directly and positively to the wheel when normal forward motion is braked. Rotation of the braking disc in the opposite direction i.e.. reverse motion, will result in braking forces being transferred through the tensioned roll pins.

As a result of the construction of the present invention, the block members can be tightened as much as is required against the web without producing any localised stressing and resultant problems in the braking surface of the braking discs. Thus, the radial extent of the braking discs can be maximised without the prior art problems.

The present invention will now be further described, by way of example, with reference to the accompanying drawings, in which.

Said one embodiment of the present invention illustrated in FIGS. 1 to 5 of the accompanying drawings comprises a central hub 1 and an outer annular rim 3, interconnected by a web 5. An integral annular braking disc 7 is secured to each side of the web by four equi-spaced-apart connection assemblies generally designated 9. Alternatively, two or three, or more than four connection assemblies 9 can be used.

Each connection assembly 9 comprises a generally rectangular block member 11 through which a recessed aperture 13 extends. In use, a bolt 15 passes through the aperture 13, through an aperture 17 in the web 5 and through a recessed aperture 13 of a corresponding block member 11 forming part of the braking disc 7 on the other side of the web 5. The block member 11 has an elongate groove 19 of arcuate transverse cross section, provided in each of its side faces 21, and a T-shaped section 23 at one end, the arms 25 of the T-shaped section overlapping one of the ends of the respective grooves 19, the purpose of which is discussed herebelow.

Each connection assembly 9 further comprises a radially extending slot 27 provided in the rear face of the braking disc 7, with an aperture 29 extending from the slot 27 through the braking disc 7. On each side of the slot 27. i.e. on opposite sides of the aperture 29, is an upstanding lug 31, each lug 31 having an elongate, arcuate cross-section groove 33 formed in the side face 35 which faces the slot 27. Located radially inwardly of the slot 27 are two projections 37 which project from the rear face of the braking disc, the purpose of which is discussed herebelow.

In assembling the connection assembly 9, a pair of pin members in the form of elongate roll pins 39 are located and held, manually or otherwise, one in each groove 19 in the block member 11. The end of the block member 11 remote from the T-shaped section 23 is then slid into the slot 27, the block member 11 being an accurate fit in the slot 27. As the block member is slid along the slot 27, the roll pins 39 engage and slide in the grooves 33 in the lugs 31. The block member 11 is thus positioned with aperture 13 over the aperture 29 in the braking disc 7.

With the four connection assemblies 9 assembled on each of the two braking discs 7, braking discs are positioned on opposite sides of the web 5 and the corresponding block members 11 of each braking disc 7 are bolted to each other by bolts 15, thus securing the block members 11 to the web 5. The bolts 15 can be tightened as much as required without applying stress to the braking discs 7 which are mounted on the block members 11 via the resilient roll pins 39 and on circumferentially spaced-apart support ribs 12 provided on the rear face of the braking disc. In this position the arms 25 of the T-shaped section 23, and the projections 37, prevent the roll pins from being moved axially sufficiently to exit the grooves 19,33.

Under braking, the braking discs 7 can expand and contract radially as heat is generated and dissipated, the lugs 31 of the respective connecting assemblies 9 moving along the respective roll pins 39. Further, as the brakes are applied, one of the roll pins 39 in each connection assembly 9 can be resiliently compressed to allow the adjacent side face 21 of the block member 11 to engage with the side face 35 of the adjacent lug 31. In this way there is a positive transfer of forces from the braking disc 7 to the web 5. As the pins 39 are located in the grooves in a slightly pre-stressed state, i.e. compressed, they can be deformed even further to take up any small clearance which may occur between faces 21 and 35. Also, the pins can accommodate any expansion of the disc across the slot 27 due to heating effects. This prevents the disc coming loose on its fixings under high thermal loads. Also, the resilient nature of the roll pins 39 takes account of manufacturing tolerances, and thus effectively minimises manufacturing costs.

Figure 1:
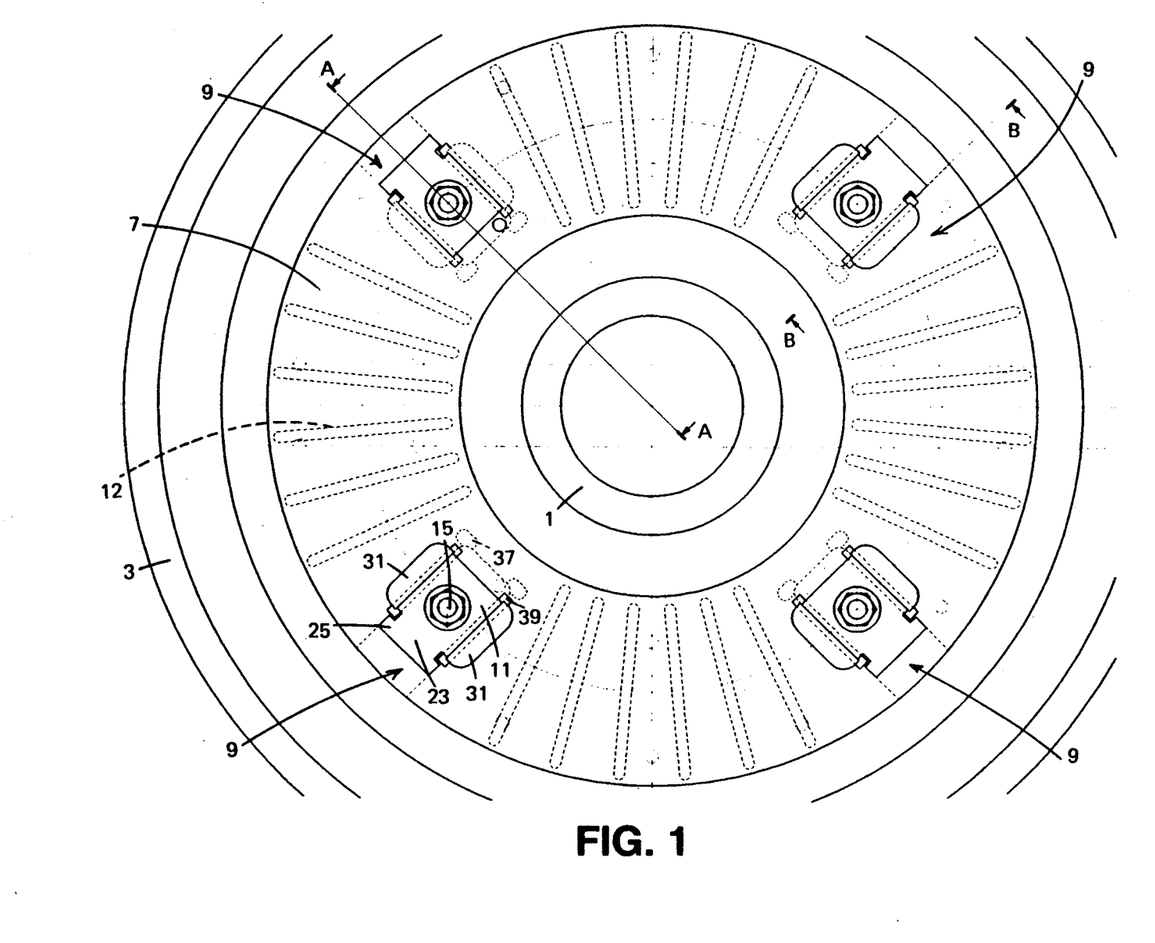
FIG. 1 is a front view of part of one embodiment of the present invention.
Figure 2:
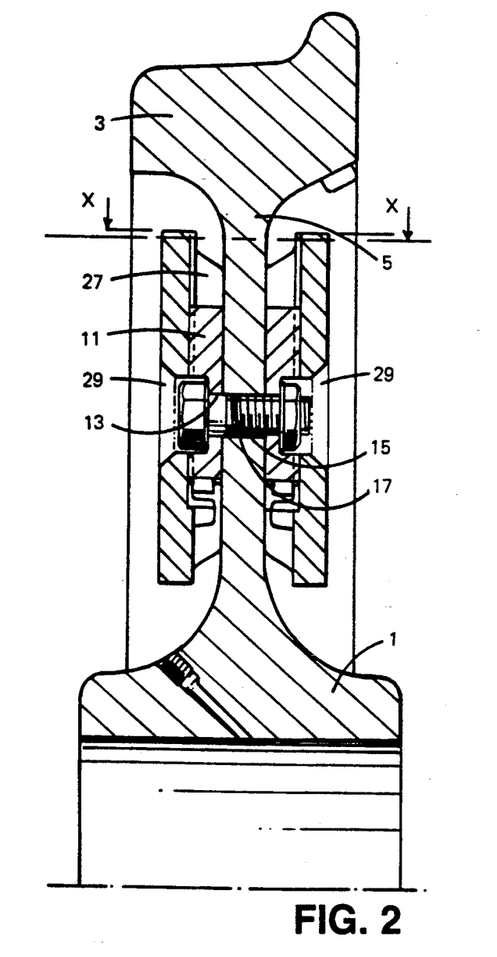
FIG. 2 is a sectional view along line A—A in FIG. 1.
Figure 3:
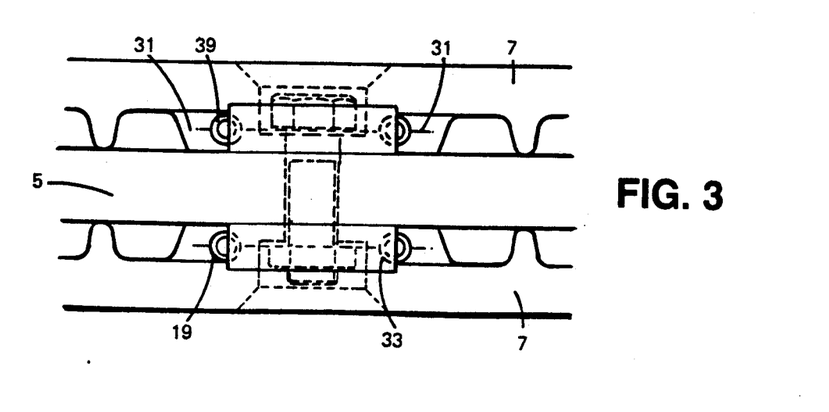
FIG. 3 is a sectional view along line X—X in FIG. 2
Figure 4:
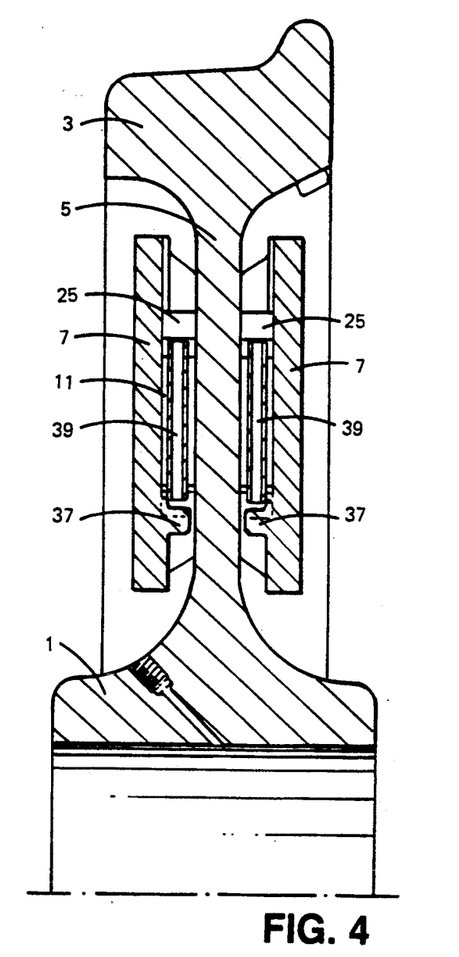
FIG. 4 is a sectional view along line B—B in FIG. 1.
Figure 5:
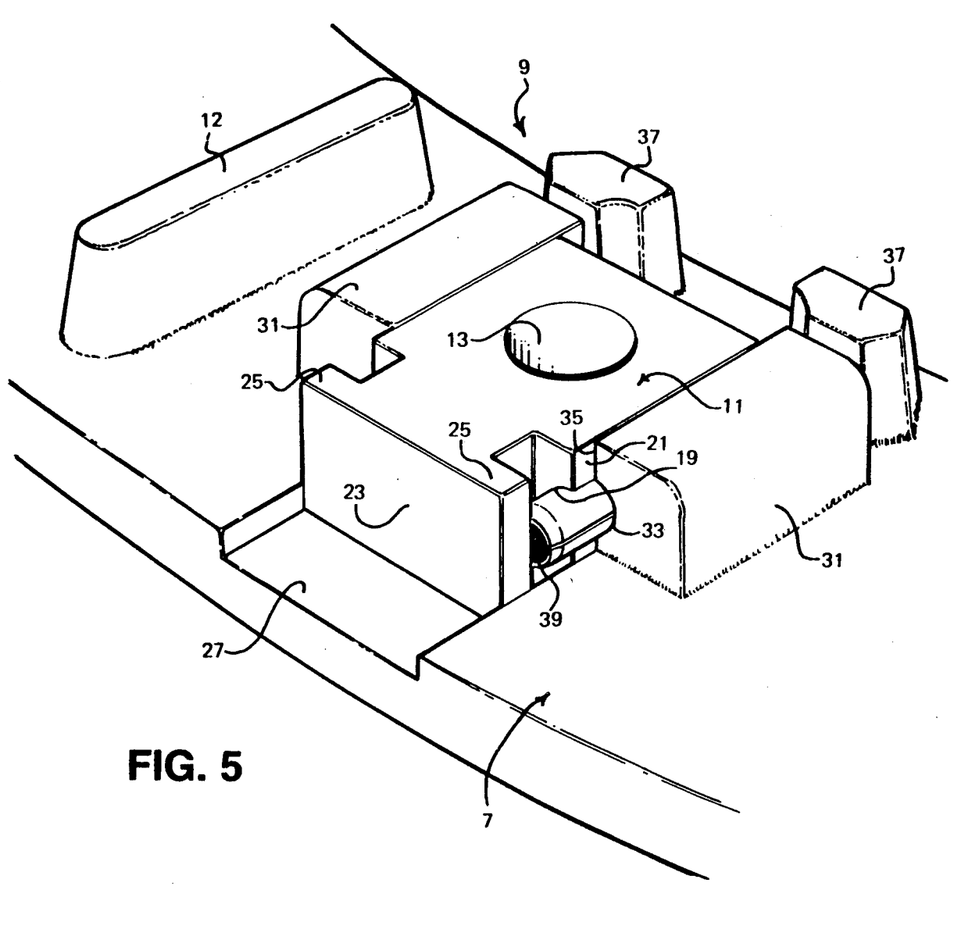
FIG. 5 is a perspective view of the connection assembly used in the embodiment of FIGS. 1 to 4.
Figure 6:
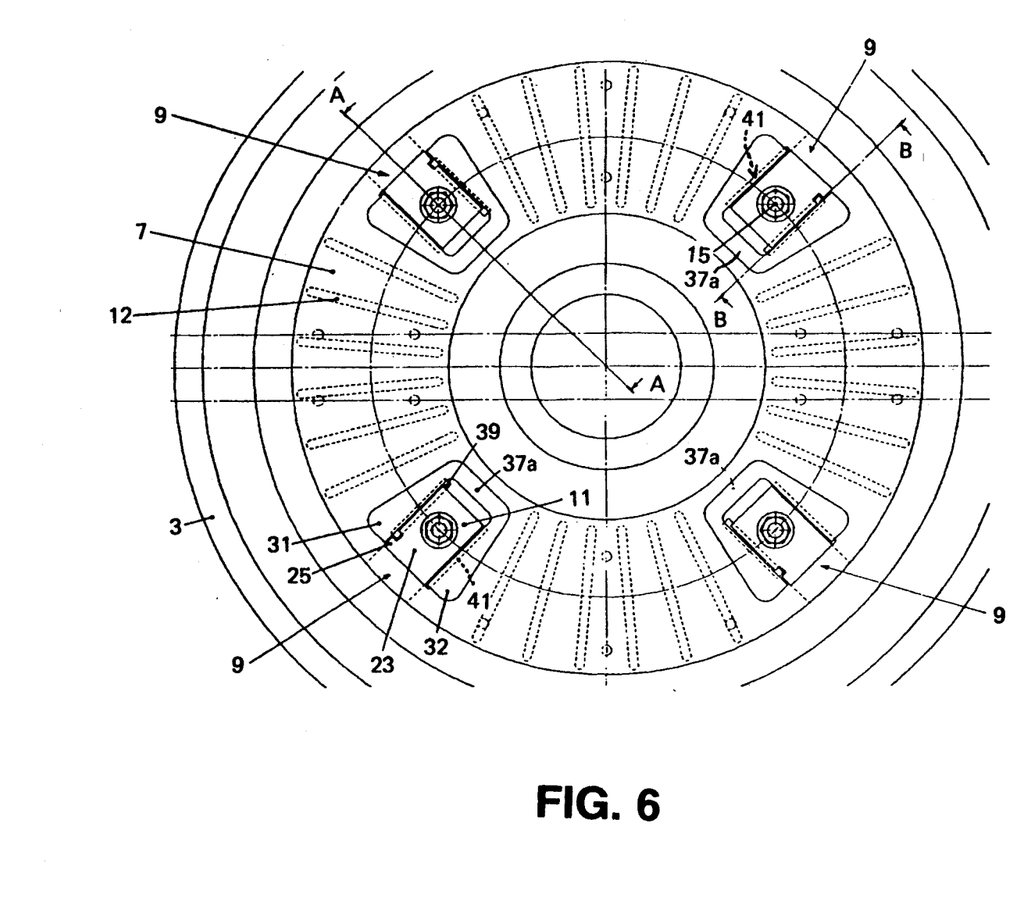
FIG. 6 is a front view of part of another embodiment of the present invention.
Figure 7:
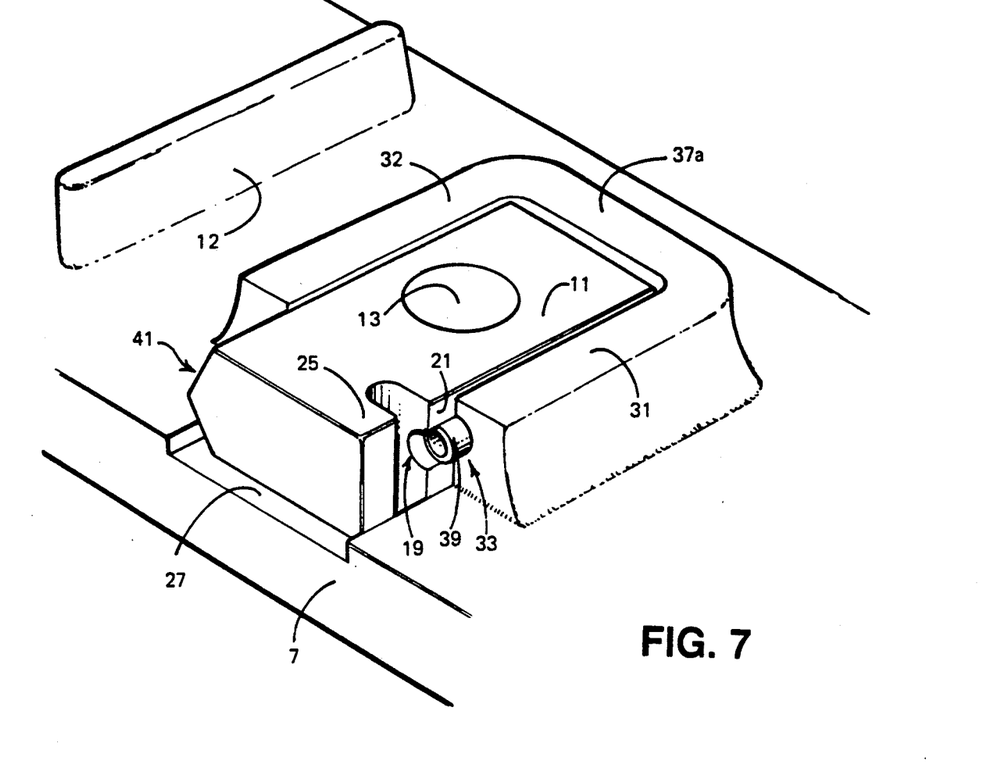
FIG. 7 is a perspective view from one side of the connection assembly used in the embodiment of FIG. 6.
Figure 8:
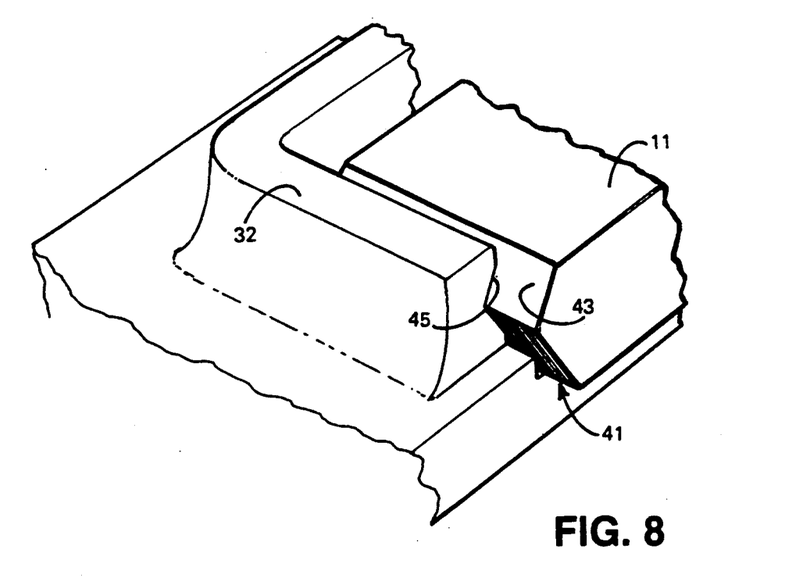
FIG. 8 is a further perspective view from the other side of part of the connection assembly of FIG. 7.

Another embodiment of the present invention is illustrated in FIGS. 6 to 8 of the accompanying drawings, and features or component parts which are the same as features or parts of the embodiment of FIGS. 1 to 5 are identified by like reference numerals. As will be best seen from FIG. 7, this another embodiment differs in the main from said one embodiment by virtue of the fact that a roll pin 39 is provided on only one side of the block member 11 in complementary grooves 19,33 provided in the block member 11 and lug 31 respectively, the opposite side face 41 of the block member 11 having a double chamfered transverse profile 43 which engages in a complementary-shaped groove 45 provided in a further lug 32. Thus, the tensioned roll pin 39 presses the chamfered transverse profile 43 into the groove 45 so that there is positive interengagement between the block member 11 and the braking disc 7, in contrast to the embodiment of FIGS. 1 to 5, wherein the block member 11 is floatingly supported between two roll pins 39. Preferably the profiled side edge 41 of the block member 11 is the leading edge of the block member having regard to the direction of rotation of the braking disc and wheel for forwards motion of the vehicle. In this way, braking forces are positively transferred to the wheel. Further, the spring force of the roll pin 39 is sufficiently strong to hold the profiled side edge of the block member in the complementary groove 45 irrespective of the vibrational forces which may result under braking.

Further, instead of having the two projections 37 of the embodiment of FIGS. 1 to 5, the lugs 31,32 are joined at their radially inner ends by an elongate ridge 37a which is integral with the braking disc 7, the ridge 37a performing the same function as the projections 37 as described hereabove with reference to the embodiment of FIGS. 1 to 5.

Figure 9:
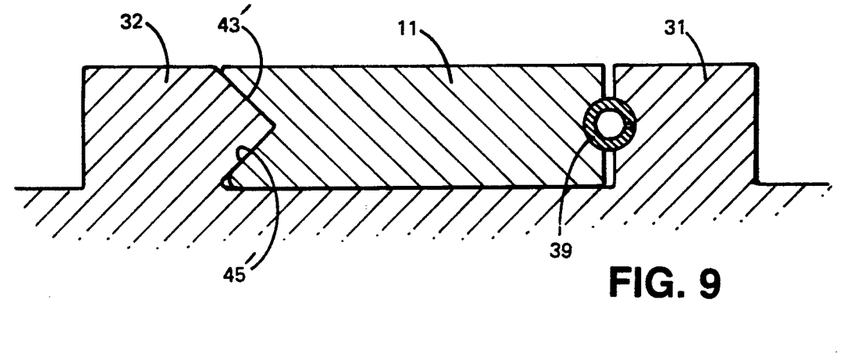
FIG. 9 is a schematic illustration of a modified configuration of the other side of the connection assembly of FIGS. 7 and 8.

As a modification to the construction shown in FIGS. 6 to 8 of the accompanying drawings, the double chamfered side edge of the block member 11 need not be an exact fit on the groove 45, and as illustrated in FIG. 9, the double chamfered profile 43' can alternatively be provided on the lug 32 with the groove 45' being formed in the facing side of the block member 11.

Figure 10:
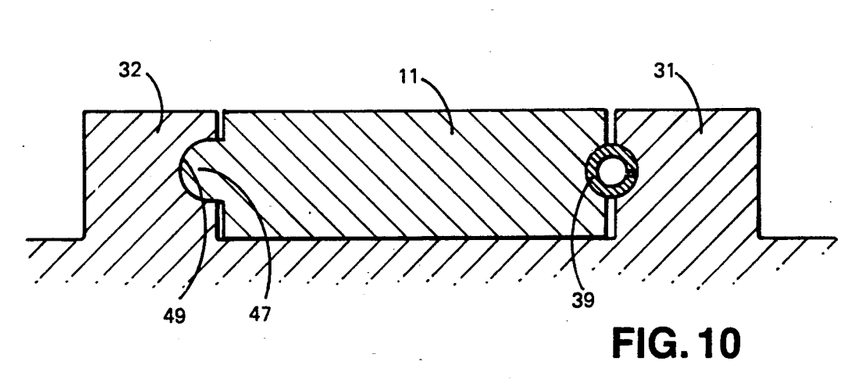
FIG. 10 is a schematic illustration of a further modified configuration of the other side of the connection assembly of FIGS. 7 and 8.
Figure 11:
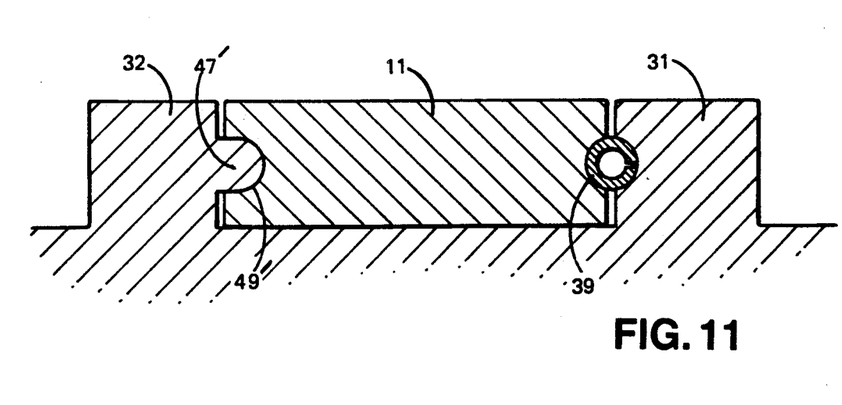
FIG. 11 is a schematic illustration of a still further modified configuration of the other side of the connection assembly of FIGS. 7 and 8.

As will be appreciated, any interengaging retaining profiles can replace the double chamfer and groove of FIGS. 6 to 9, and one such alternative is illustrated in FIG. 10 with its opposite being illustrated in FIG. 11. This alternative has an arcuate transverse profile 47 which is an exact fit in a complementary groove 49, the profile 47 being formed on the block member 11 with the groove 49 in lug 32, in FIG. 10, and the groove 49' in the block member 11 with the profile 47' on the lug 32 in FIG. 11. Further, rather than be an exact fit, the arcuate profile may be a loose fit in the groove 49, the roll pin 39 holding the profile 47 at the base apex of the groove 49 to hold the block member 11 in position relative to the braking disc 7.

The present invention thus provides a wheel wherein the braking discs are positively, though not directly, bolted to the web, thus reducing stress problems, whilst allowing for expansion and contraction.

We claim:

1. A wheel comprising a central hub and an outer rim interconnected by a web, a pair of annular braking discs being mounted one on each side of the web, each annular braking disc being secured to the web by at least two connection assemblies, each connection assembly comprising a block member adapted to be bolted to the web, the block having a first elongate groove located in one of the side faces on an outer surface of the block member, said first groove having an arcuate cross-section, an elongate pin member engaging in said first groove and in a second elongate groove of arcuate transverse cross-section, provided on the braking disc, said second groove in the braking disc extending generally radially of the braking disc to one side of an aperture provided in the braking disc, over which aperture the block member is located, the opposite side face on the outer surface of the block member being held by the braking disc in a region of the braking disc on the opposite side of said aperture.

2. A wheel according to claim 1, wherein corresponding connection assemblies of the two braking discs are joined together by a bolt which passes through an aperture in the web and bolts the respective block members together against opposite sides of the web.

3. A wheel according to claim 1, wherein four connection assemblies are equi-spaced apart around each annular braking disc.

4. A wheel according to claim 1, wherein said brake disc has a rear face facing said web and wherein said second groove in the braking disc is provided in a side face of a lug which projects from the rear face of the braking disc and a third groove similar to said second groove is provided in an oppositely directed side face of another such lug which is circumferentially spaced from the first mentioned lug with respect to the braking disc on the other side of said aperture, said block member having a fourth arcuate cross-section groove in its opposite side face, and a second pin member similar to said first elongate pin member which engages said third and fourth grooves.

5. A wheel according to claim 4, wherein each elongate pin member is in the form of a roll pin which is resiliently compressed transverse to its longitudinal axis when located in the grooves of the block member and lugs.

6. A wheel according to claim 4, wherein projections are provided on the rear face of the additional lateral projections are provided on the block member so as to respectively overlap opposite ends of the first and fourth grooves in the block member.

7. A wheel according to claim 1, wherein said braking disc has a rear face facing said web and wherein said second groove in the braking disc is provided in a side face of a lug which projects from the rear face of the braking disc, and a further lug located on the opposite side of said aperture to the first mentioned lug is provided with a region which is profiled to engage and retain an opposite side face of said block member when located between said lugs.

8. A wheel according to claim 7, wherein the block member has a double chamfered side face which extends generally radially of the braking disc and which engages in a substantially complementarily shaped region of said further lug.

9. A wheel according to claim 7, wherein the further lug has a double chamfered side face profile which engages in a complementarily shaped groove in said side face of the block member.

10. A wheel according to claim 7, wherein the block member has an arcuate transverse profile side face which engages in a complementarily shaped region of said further lug.

11. A wheel according to claim 7, wherein said further lug has an arcuate transverse profile side face which engages in a complementarily shaped groove in said side face of the block member.

12. A wheel according to claim 7, wherein the elongate pin member is in the form of a roll pin which is resiliently compressed transverse to its longitudinal axis when located in the grooves of the block member and said lug.

13. A wheel according to claim 7, wherein a projection is Provided on the rear face of each braking disc adjacent to one end of each said lug, and a lateral projection is provided on each block member so as to respectively overlap opposite ends of the first groove in the block member.

14. A wheel according to claim 7, wherein the pin member is a transversely compressed roll pin, and it is the leading edge of the block member, having regard to the direction of rotation of the wheel for normal forwards motion, which is engaged with said further lug.

* * * * *

UNITED STATES PATENT AND TRADEMARK OFFICE
CERTIFICATE OF CORRECTION

PATENT NO.   :   5,101,940
DATED        :   April 7, 1992
INVENTOR(S)  :   Keith Mungo, Brian D. Thomas and Simon C. Bromley It is certified that error appears in the above-identified patent and that said Letters Patent is hereby corrected as shown below:

On the title page, Items:

[54] VEHICLE BRAKING DISC SECURED WITH AN ASSEMBLY OF PINS AND BLOCKS

[75] Inventors: Keith Mungo, Liverpool; Brian D. Thomas; Simon C. Bromley, both of Wirral, all of England

[73] Assignee: Sab Wabco (Holdings) B.V., Heerhugowaard, Holland

Column 1, in the title change "PINE" to --PINS--.

Signed and Sealed this

Twenty-sixth Day of October, 1993

Attest:

BRUCE LEHMAN

Attesting Officer     Commissioner of Patents and Trademarks